United States Patent
Izuta et al.

(10) Patent No.: US 6,633,345 B2
(45) Date of Patent: Oct. 14, 2003

(54) RECEIVER SELECTIVELY RECEIVING, DEMODULATING AND OUTPUTTING A TV BROADCAST SIGNAL AND AN FM RADIO BROADCAST SIGNAL

(75) Inventors: Hiroshi Izuta, Tokyo (JP); Akio Ohnishi, Tokyo (JP)

(73) Assignees: Mitsubishi Denki Kabushiki Kaisha, Tokyo (JP); Kyoei Sangyo Co., Ltd., Tokyo (JP)

(*) Notice: Subject to any disclaimer, the term of this patent is extended or adjusted under 35 U.S.C. 154(b) by 342 days.

(21) Appl. No.: 09/739,253

(22) Filed: Dec. 19, 2000

(65) Prior Publication Data

US 2002/0030763 A1 Mar. 14, 2002

(30) Foreign Application Priority Data

Jul. 26, 2000 (JP) .......................... 2000-225979

(51) Int. Cl.[7] .............................. H04N 5/44; H04N 5/46
(52) U.S. Cl. ..................... 348/729; 348/735; 455/188.1
(58) Field of Search .................................. 348/725, 726, 348/727, 729, 735, 738, 553; 455/130, 132, 180.1, 180.2, 188.1, 188.2; H04N 5/46, 5/44

(56) References Cited

U.S. PATENT DOCUMENTS 5,926,750 A * 7/1999 Ishii ........................... 455/130
6,211,925 B1 * 4/2001 Kikuchi ...................... 348/729
6,219,108 B1 * 4/2001 LeRoy ........................ 348/724
6,353,462 B1 * 3/2002 Osada et al. ................ 348/726
6,483,552 B1 * 11/2002 Yamamoto .................. 348/729

FOREIGN PATENT DOCUMENTS

| JP | 58-159031 | 9/1983 |
| JP | 7-162771 | 6/1995 |
| JP | 37-307644 | 11/1995 |

OTHER PUBLICATIONS

U.S. patent application Ser. No. 09/549178, Kikuchi, filed Apr. 13, 2000.

* cited by examiner

Primary Examiner—John Miller
Assistant Examiner—Brian Yenke
(74) Attorney, Agent, or Firm—Leydig, Voit & Mayer, Ltd.

(57) ABSTRACT

A receiver includes a tuner that converts an FM radio broadcast signal into an intermediate frequency signal that has the same frequency as a sound intermediate frequency subcarrier signal when receiving the television broadcast signal and outputs the intermediate frequency signal when receiving the FM radio broadcast signal, a SAW filter passing only an intermediate frequency band of the output of the tuner, a video detector detecting a video signal containing a sound subcarrier signal when receiving the television broadcast signal and detecting a sound subcarrier signal when receiving the FM radio broadcast signal, a VIFAGC circuit making the video signal have a constant amplitude, and an AGC circuit making a sound subcarrier signal output from a band pass filter have a constant amplitude.

8 Claims, 6 Drawing Sheets

RECEIVER SELECTIVELY RECEIVING, DEMODULATING AND OUTPUTTING A TV BROADCAST SIGNAL AND AN FM RADIO BROADCAST SIGNAL

FIELD OF THE INVENTION

The present invention in general relates to a receiver by which a television broadcast signal and an FM radio broadcast signal can be selectively received and can be demodulated and output. More particularly, this invention relates to a receiver which is lightweight and small in size.

BACKGROUND OF THE INVENTION

Recently, accompanied with the prevalence of portable color televisions, for example liquid crystal televisions, a television receiver receiving a general FM broadcast has appeared. This television receiver can receive sound signals of FM radio broadcast signals by employing a high frequency circuit, such as a tuner, and a sound signal demodulation circuit for a television broadcast signal. When a sound signal of an FM radio broadcast signal is demodulated, the demodulation does not employ a video intermediate carrier signal of a television broadcast signal.

Figure 6:
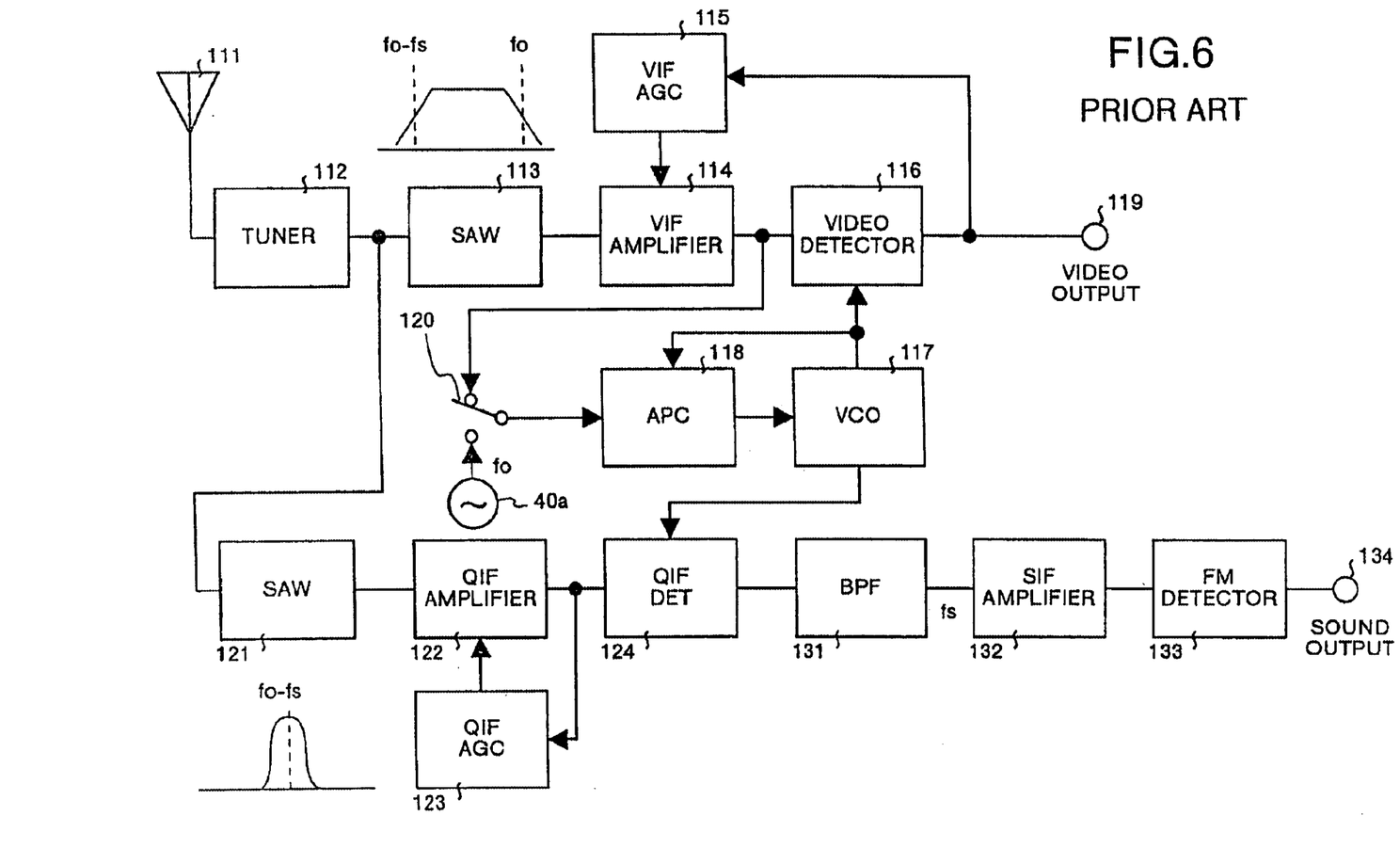
FIG. 6 is a block diagram which shows the structure of a conventional receiver.

FIG. 6 is a block diagram showing the structure of a conventional television receiver which can also receive an FM radio broadcast signal. First, the occasion on which a television broadcast signal is received is explained. A tuner 112 is used for tuning to a television broadcast signal received via an antenna 111. The tuner 112 down converts the received signal to an intermediate frequency, and outputs this intermediate frequency band signal to SAW filters 113, 121. The SAW filter 113 passes the intermediate frequency band having a video intermediate carrier frequency, fo, and outputs it to a VIF amplifier 114. The VIF amplifier 114 amplifies the intermediate frequency band signal and outputs it to a video detector 116 and also to a switch 120.

The switch 120 is connected to a terminal to which the output of the VIF amplifier 114 is supplied when receiving the television broadcast signal, and the intermediate frequency band signal is output to an APC (automatic phase control circuit) 118 via the switch 120. The APC 118 detects the phase difference between (i) the video intermediate carrier frequency fo in the intermediate frequency band signals and (ii) a signal that a voltage control oscillation circuit (VCO) 117 outputs, and outputs the phase difference to the VCO 117. The VCO 117 outputs the signal of the video intermediate carrier frequency fo which is phase locked to the video intermediate carrier frequency fo to the video detector 116 based on the phase difference. The video detector 116 detects a video signal based on the signal of the video intermediate carrier frequency fo that the VCO 117 outputs and outputs the detected video signal to a terminal 119. The detection output of the video detector 116 is outputted to a VIFAGC circuit 115, and the VIFAGC circuit 115 provides gain control to stabilize the amplitude of the detection output of the video detector 116 with respect to the VIF amplifier 114.

On the other hand, the SAW filter 121 passes an intermediate frequency (fo-fs), and a QIF amplifier 122 amplifies this intermediate frequency based on the gain control by a QIFAGC circuit 123 and outputs it to an intermediate frequency detection circuit (QIFDET) 124. The intermediate frequency detection circuit 124 mixes the inputted intermediate frequency (fo-fs) with the video intermediate carrier frequency fo output from the VCO 117 and outputs a sound subcarrier frequency, fs. Then, the sound subcarrier frequency fs is extracted via a band pass filter 131 and is amplified by an SIF amplifier 132, and a sound signal detected and output by an FM detector 133 is output from a terminal 134.

When receiving the FM radio broadcast signal, the tuner 112 down converts the signal to an intermediate frequency that is the same as the intermediate frequency (fo-fs) and outputs it to the SAW filter 121. After that, the FM sound intermediate frequency fs is detected by the intermediate frequency detection circuit 124, similarly to the sound subcarrier frequency fs, and, lastly, a sound signal is output from the terminal 134. In this case, since the VCO does not output the video intermediate carrier frequency fo, the switch 120 is connected to the input side of the oscillation frequency fo corresponding to the video intermediate carrier frequency fo, and the oscillation frequency fo is output to the APC 118. In this way, the VCO 117 outputs a phase locked oscillation frequency fo to the intermediate frequency detection circuit 124 and detects and outputs the FM sound intermediate frequency fs.

In the conventional receiver, a video signal related intermediate frequency processing circuit of a television broadcast signal and a sound signal related intermediate frequency processing circuit of a sound signal of a television broadcast signal and a sound signal of an FM radio broadcast signal are independently provided. Accordingly, demodulation characteristic of a sound signal of an FM radio broadcast signal can be set optimally.

However, since the video signal related intermediate frequency processing circuit and the sound signal related intermediate frequency processing circuit are independently provided, many parts and circuit blocks have to be provided, and thus there is a problem that the cost increases and also it is impossible to obtain a lightweight and small size receiver.

SUMMARY OF THE INVENTION

It is an object of the present invention to obtain a receiver by which an FM radio broadcast signal can be received in addition to the reception of a television broadcast receiving signal and which is lightweight and small in size.

In the receiver according to one aspect of this invention, when receiving the television broadcast signal, a first switch selects a video intermediate carrier signal output by an intermediate frequency amplifier and a second switch is switched towards and connected to a first automatic gain controller. A tuner converts the television broadcast signal into an intermediate frequency, and a band limit filter passes this intermediate frequency so that the intermediate frequency is amplified by the intermediate frequency amplifier. On this occasion, the intermediate frequency amplifier is gain controlled so that the amplitude of the video signal that the video detector outputs is made constant by the first automatic gain controller. When receiving the FM radio broadcast, the first switch is switched towards a self-running oscillation signal, and the second switch is switched towards and connected to a second automatic gain controller. The tuner converts the FM radio broadcast signal into an intermediate frequency that is the same as the sound intermediate frequency subcarrier signal when receiving the television broadcast signal and outputs it when receiving the FM radio broadcast signal. The band limit filter passes this intermediate frequency, and the intermediate frequency is amplified by the intermediate frequency amplifier. On this occasion, the intermediate frequency amplifier is gain controlled so that the amplitude of the sound subcarrier signal that the sound band limit filter outputs is made constant by the second automatic gain controller. With this, the band limit filter of the exclusive use of sound, the intermediate frequency amplification circuit of the exclusive use of sound, and the intermediate frequency detection circuit of the exclusive use of sound become unnecessary, and a sound signal having a high quality can be demodulated and outputted even when receiving the FM radio broadcast signal.

In the receiver according to another aspect of this invention, when receiving the television broadcast signal, a first switch selects a video intermediate carrier signal output by an intermediate frequency amplifier, and a second switch is switched towards and connected to a first automatic gain controller. A tuner converts the television broadcast signal into an intermediate frequency, and a band limit filter passes this intermediate frequency so that the intermediate frequency is amplified by the intermediate frequency amplifier. On this occasion, the intermediate frequency amplifier is gain controlled so that the amplitude of the video signal that the video detector outputs is made constant by the first automatic gain controller. After that, the video detector outputs the video signal containing the sound subcarrier signal from the intermediate frequency signal of the video intermediate frequency band amplified by the intermediate frequency amplifier. When receiving the FM radio broadcast, the first switch is switched towards a self-running oscillation signal, and the second switch is switched towards and connected to a second automatic gain controller. The tuner converts the FM radio broadcast signal into an intermediate frequency that is the same as the sound intermediate frequency subcarrier signal when receiving the television broadcast signal and outputs it when receiving the FM radio broadcast signal. The band limit filter passes this intermediate frequency, and the intermediate frequency is amplified by the intermediate frequency amplifier. On this occasion, the intermediate frequency amplifier is gain controlled so that the amplitude of the sound subcarrier signal that the sound band limit filter outputs is made constant by the second automatic gain controller. After this, the video detector detects and outputs the sound subcarrier signal from the intermediate frequency signal of the video intermediate frequency band amplified by the intermediate frequency amplifier. On this occasion, the video detector detects and outputs the sound subcarrier signal based on the self-running oscillation signal that a second phase synchronizer outputs which is provided independently of a first phase synchronizer employed when receiving the television broadcast signal. With this, the band limit filter of the exclusive use of sound, the intermediate frequency amplification circuit of the exclusive use of sound, and the intermediate frequency detection circuit of the exclusive use of sound become unnecessary. Further, detecting and outputting a frequency is performed by the first phase synchronizer and the second phase synchronizer each provided independently so that quality deterioration of the sound signal due to unevenness in phase synchronization when receiving the FM radio broadcast signal can be restrained.

Other objects and features of this invention will become apparent from the following description with reference to the accompanying drawings.

DESCRIPTION OF THE PREFERRED EMBODIMENTS

Five preferred embodiments of a receiver according to the present invention will be explained here in detail referring to the attached drawings.

Figure 1:
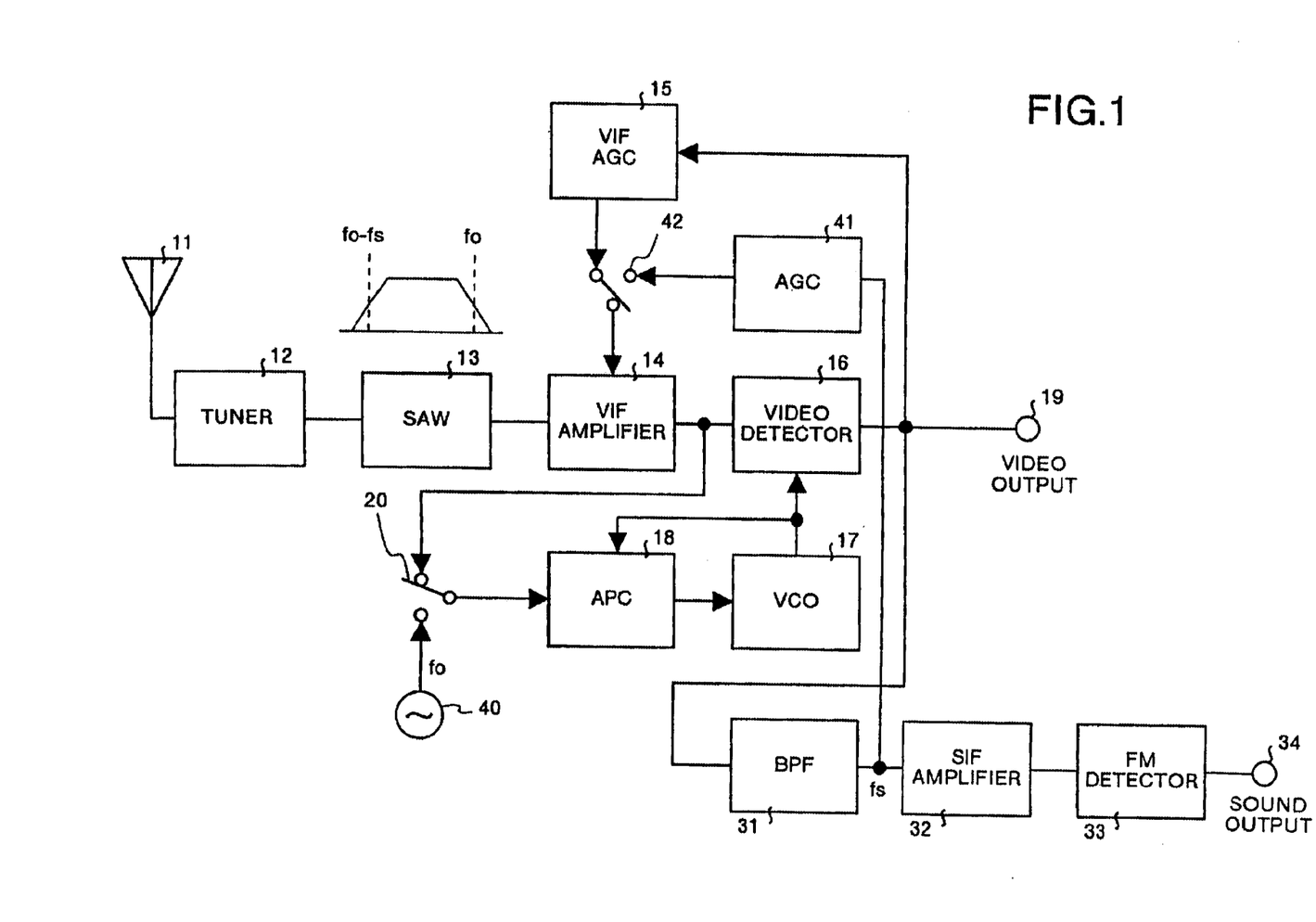
FIG. 1 is a block diagram which shows the structure of a receiver of a first embodiment of the present invention.

FIG. 1 is a block diagram which shows the structure of a receiver of a first embodiment of the present invention. An antenna 11 receives a television broadcast signal and an FM radio broadcast signal. A tuner 12 tunes the signal received by the antenna 11. When receiving the television broadcast signal, the tuner 12 converts the signal into an intermediate frequency signal including the modulation component of an image and the modulation component of sound and outputs it to a surface acoustic waves (SAW) filter 13. On the other hand, when receiving the FM radio broadcast signal, the tuner 12 converts the signal into an intermediate frequency signal with the same frequency as a sound intermediate frequency component when receiving the television broadcast signal and outputs it to the SAW filter 13. The SAW filter 13 performs a band limit so as to pass a video intermediate frequency band and passes the intermediate frequency signal.

Operations when receiving the television broadcast signal will be explained. The intermediate frequency signal passing through the SAW filter 13 is amplified to a constant level by a VIF amplifier 14 and is outputted to a video detector 16. The video detector 16 synchronously detects the intermediate frequency signal inputted from the VIF amplifier 14 by the signal of a video intermediate frequency carrier frequency of outputted from a voltage control oscillator (VCO) 17 and outputs a video signal as a detection output to a terminal 19 as well as a band pass filter 31.

When receiving the television broadcast signal, a switch 20 is connected to a terminal that receives the output from the VIF amplifier 14. Thus, the intermediate frequency signal of the VIF amplifier 14 is inputted into an automatic phase detector (APC) 18. The APC 18 compares the phase of the output signal of the voltage control oscillator (VCO) 17 with the phase of the intermediate frequency signal inputted from the VIF amplifier 14 and outputs this phase difference to the VCO 17. The VCO 17 outputs a signal corresponding to the video intermediate frequency carrier frequency of to the video detector 16 based on the phase difference. That is, a phase synchronization loop is formed by the VCO 17 and the APC 18.

When receiving the television broadcast signal, a switch 42 is connected to a terminal that receives the output of a VIF automatic gain control (AGC) circuit 15. The VIFAGC circuit 15 controls the gain of the VIF amplifier 14 so that the video signal outputted from the video detector 16 has a constant amplitude.

Here, suppose that the video intermediate frequency carrier frequency is "fo" and the sound subcarrier frequency is "fs," then the sound intermediate frequency subcarrier frequency is "of-fs." Since the oscillation frequency from the VCO 17 is the video intermediate frequency carrier frequency of, the sound subcarrier frequency fs is included in the video signal outputted from the video detector 16.

The band pass filter 31 extracts the signal of the sound subcarrier frequency fs and outputs it to an SIF amplifier 32. The SIF amplifier 32 amplifies the sound subcarrier frequency fs and outputs it to an FM detector 33. The FM detector 33 FM detects the signal of the sound subcarrier frequency fs and converts it to a sound signal to output it to a terminal 34 as a sound output.

Next, operations when receiving the FM radio broadcast signal will be explained. The intermediate frequency signal passing through the SAW filter 13 is amplified to a constant level by the VIF amplifier 14 and is outputted to the video detector 16. The video detector 16 synchronously detects the intermediate frequency signal inputted from the VIF amplifier 14 by the signal of the oscillation frequency of corresponding to the video intermediate frequency carrier frequency of outputted from the VCO 17 and outputs an FM intermediate frequency fs corresponding to the sound subcarrier frequency fs when receiving the television broadcast signal to the band pass filter 31.

Since the video intermediate frequency carrier frequency of is not included in the intermediate frequency outputted from the VIF amplifier 14, the FM intermediate frequency fs cannot be stabilized. Therefore, by switching the switch 20 to a terminal that receives the output of an oscillator 40, the self-running oscillation frequency of corresponding to the video intermediate frequency carrier frequency of that the oscillator 40 outputs is inputted into the APC 18 so that the APC 18 and the VCO 17 form a phase synchronization loop to output the oscillation frequency of that is phase locked to the video detector 16. The video detector 16, employing this oscillation frequency of, generates the FM intermediate frequency fs and outputs it to the band pass filter 31.

The band pass filter 31 extracts the signal of the FM intermediate frequency fs similarly to when receiving the television broadcast signal and outputs it to the SIF amplifier 32. The SIF amplifier 32 amplifies the inputted FM sound intermediate frequency fs and outputs it to the FM detector 33. The FM detector 33 FM detects the signal of the inputted FM sound intermediate frequency fs and converts it into a sound signal to output it as a sound output to the terminal 34.

When receiving the FM radio broadcast signal, the switch 42 is connected to an AGC circuit 41 side. The AGC circuit 41 controls the gain of the VIF amplifier 14 so that the FM sound intermediate frequency fs outputted from the band pass filter 31 has a constant amplitude.

Thus, when receiving the FM radio broadcast signal, the tuner 12 outputs the intermediate frequency that is the same as the intermediate frequency when receiving the television broadcast signal. The video signal and the sound signal of the television broadcast signal and the sound signal of the FM radio broadcast signal are demodulated using a single SAW filter 13. Therefore, there is no need to provide the SAW filter 121 of the exclusive use of sound, the intermediate frequency amplifier circuit 122 of the exclusive use of sound, the intermediate frequency detection circuit 124 of the exclusive use of sound, and the intermediate frequency AGC circuit 123 of the exclusive use of sound, which are provided in a conventional receiver. Thus, a receiver can be realized through a simple structure, and a lightweight miniaturization can be facilitated.

Further, since gain control is performed for the intermediate frequencies respectively corresponding to that when receiving the television broadcast signal and when receiving the FM radio broadcast signal, stable demodulation processing can be performed.

Figure 2:
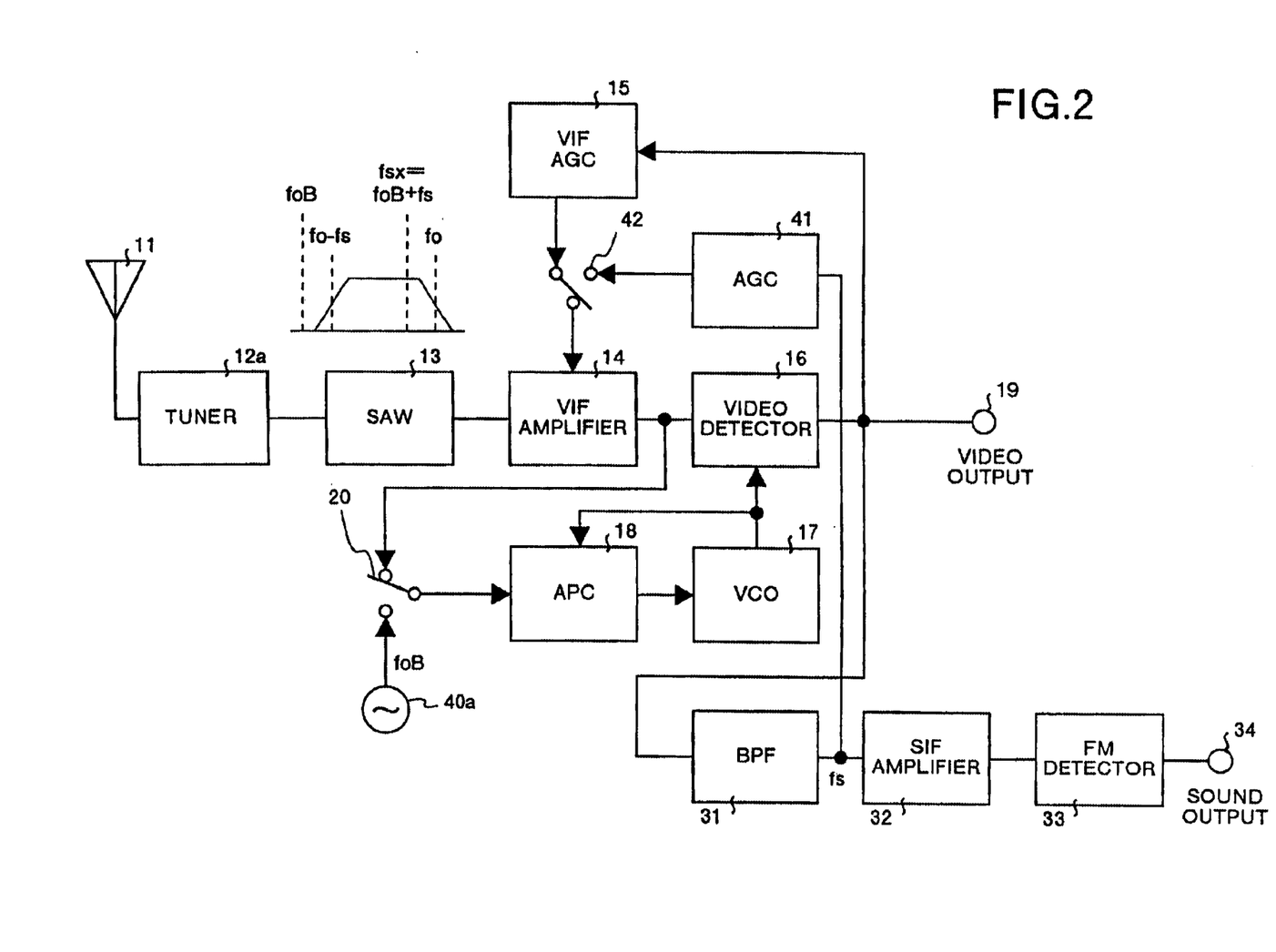
FIG. 2 is a block diagram which shows the structure of a receiver of a second embodiment of the present invention.

Next, a second embodiment of the present invention will be explained. In the first embodiment described above, the video detector 16 detects and outputs the FM sound intermediate frequency fs, employing the self-running oscillation frequency of corresponding to the video intermediate frequency carrier frequency of which is phase locked by the oscillator 40, the APC 18, and the VCO 17 when receiving the FM radio broadcast signal. However, in this second embodiment, a tuner 12a generates an intermediate frequency having a high passing gain for the SAW filter 13 when receiving the FM radio broadcast signal, and an oscillator 40a outputs an oscillation frequency foB by which the FM sound intermediate frequency fs can be detected and outputted with respect to this intermediate frequency to the video detector 16.

FIG. 2 is a block diagram which shows the structure of a receiver of the second embodiment of the present invention. The receiver is provided with a tuner 12a instead of the tuner 12 shown in the first embodiment. Further, an oscillator 40a is provided instead of the oscillator 40. Other components are the same as those explained in connection with the first embodiment, they have be provided with the same legends.

Generally, the SAW filter 13 for a band limit used in an intermediate frequency processing circuit employed in a receiver receives the signal which is remaining side band modulated. Thus, gain increment of the remaining part exists, and the gain of the gain increment part is regulated. Therefore, there is attenuation of −6 dB at the video carrier intermediate frequency of, and there is attenuation of approximately −6 to −10 dB at the sound subcarrier frequency (of-fs). When the intermediate frequency of the FM radio broadcast signal is received employing the SAW filter 13 having that type of attenuation characteristics, sensitivity loss of approximately −6 to −10 dB is generated compared with the central part of the passing band of the SAW filter 13.

Accordingly, in this second embodiment, when the FM radio broadcast signal is received, the tuner 12a outputs an intermediate frequency fsx passing through the central part of the passing band of the SAW filter 13. In order to detect the FM sound intermediate frequency fs relative to this intermediate frequency fsx, the oscillator 40a oscillates the oscillation frequency foB and outputs the oscillation frequency foB outputted by the phase synchronization loop circuit formed by the APC 18 and the VCO 17 to the video detector 16.

This oscillation frequency foB satisfies one of the following equations (1) or (2).

$$foB = fsx + fs \qquad (1)$$

$$foB = fsx - fs \qquad (2)$$

The switch 20 is connected to the terminal that receives the output of the VIF amplifier 14 when receiving the television broadcast signal. Therefore, the video intermediate carrier frequency of in which the VCO 17 is phase locked is input into the video detector 16. The video detector 16 detects and outputs the video signal and the sound subcarrier frequency fs. The switch 20 is connected to the terminal that receives the output of the oscillator 40a when receiving the FM radio broadcast signal. Therefore, the oscillation frequency foB in which the VCO 17 is phase locked is input into the video detector 16. The video detector 16 detects and outputs the FM sound intermediate frequency fs. In this case, by setting the intermediate frequency fsx inputted to the video detector 16 at a frequency of the central part of the passing band of the SAW filter 13, there is no attenuation in gain, and the frequency fsx is inputted to the video detector 16 so as to detect and output the FM sound intermediate frequency with a low sensitivity loss. The intermediate frequency fsx may be set to a part in which the gain attenuation of the passing band of the SAW filter 13 is small, and as far as this condition is satisfied, the frequency fsx can be set as an arbitrary intermediate frequency fsx.

Thus, when receiving the FM radio broadcast signal, the tuner 12a generates the intermediate frequency fsx in which there is no gain attenuation for the passing band of the SAW filter 13, and the oscillator 40a outputs an arbitrary oscillation frequency foB by which the FM sound intermediate frequency fs can be detected and outputted relative to that intermediate frequency fsx to the video detector 16 side. Therefore, the FM sound intermediate frequency fs with a low sensitivity loss can be detected and outputted.

Figure 3:
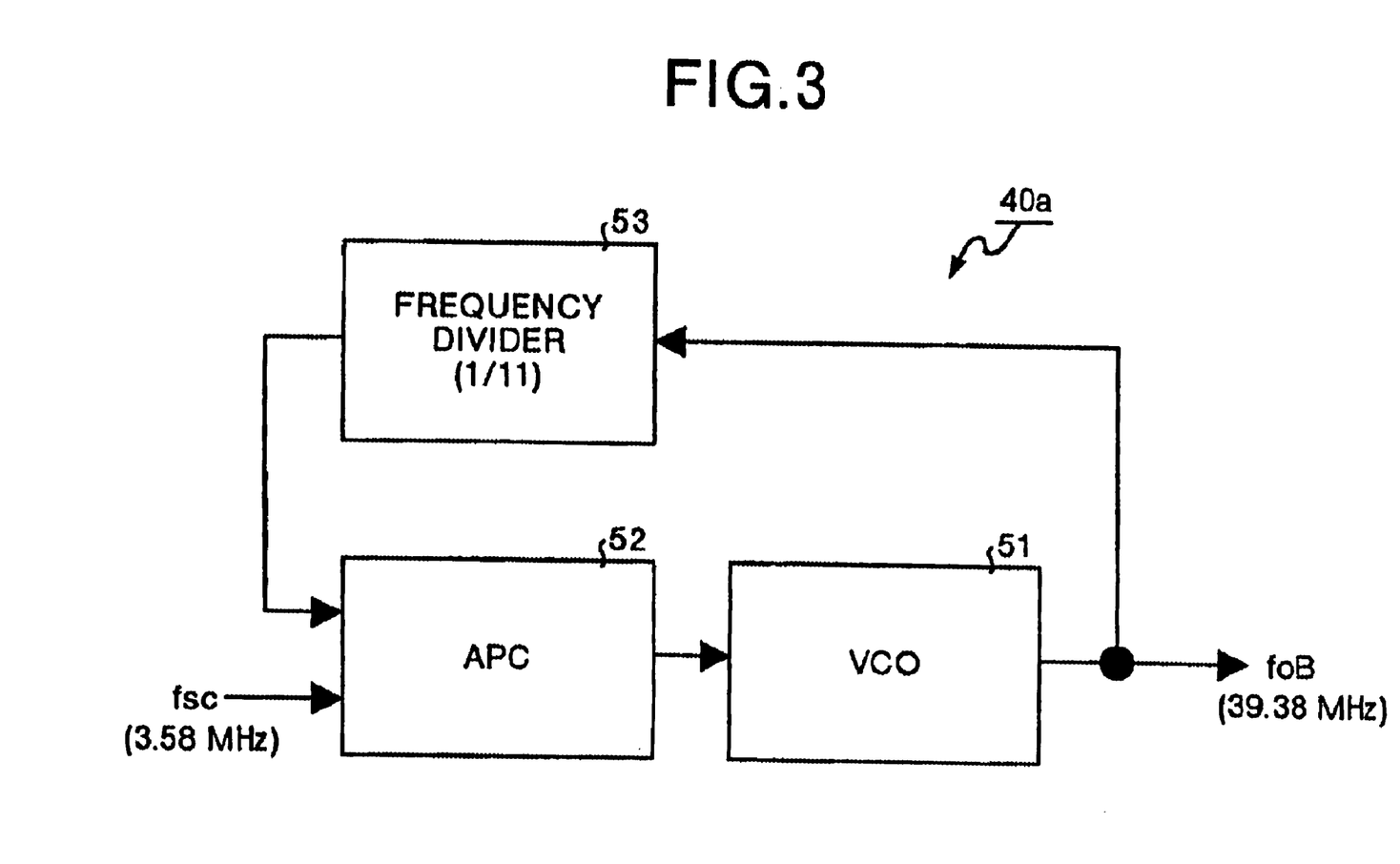
FIG. 3 is a block diagram which shows the structure of the oscillator of a receiver of a third embodiment of the present invention.

A third embodiment of the present invention will now be explained. In this third embodiment, the oscillator 40a shown in the second embodiment described above is efficiently formed.

FIG. 3 is a block diagram which shows the structure of the oscillator 40a applied to a receiver of the third embodiment of the present invention. This oscillator 40a can be used as the oscillator 40a in the second embodiment. This oscillator 40a is a phase synchronization loop circuit composed of a VCO 51, an APC 52, and a frequency divider 53. This oscillator 40a generates and outputs the oscillation frequency foB of 39.38 MHz based on a color signal subcarrier frequency fsc of 3.58 MHz employed in color signal demodulation incorporated in a receiver of an NTSC system.

In case of NTSC system, the color signal subcarrier frequency fsc of 3.58 MHz is stably generated inside the receiver. This color signal subcarrier frequency fsc is inputted into the APC 52. The APC 52 detects the phase difference between the frequency obtained by dividing the oscillation frequency foB outputted from the VCO 51 into 11 by means of the frequency divider 53 and the color signal subcarrier frequency fsc and outputs it to the VCO 51. The VCO 51 performs phase control for the oscillation frequency foB based on that phase difference, and outputs it to the APC 18.

When the oscillation frequency foB of 39.38 MHz is employed, the intermediate frequency fsx when receiving the FM radio broadcast signal becomes as follows according to the equation (1).

$$fsx = foB + fs$$
$$= 39.38 \text{ MHz} + 4.5 \text{ MHz}$$
$$= 43.88 \text{ MHz}$$

Here, when the SAW filter 13 has a characteristic that the video intermediate frequency band having a video intermediate carrier frequency of of 45.75 MHz employed in North American area is passed, this intermediate frequency fsx is located in approximately the center of the passing band of the SAW filter 13. Since there is no gain attenuation, the FM sound intermediate frequency fs having a low sensitivity loss can be produced and outputted.

Thus, since the oscillation frequency foB is generated utilizing the color signal subcarrier frequency fsc of 3.58 MHz incorporated in a receiver, providing a special oscillation source is not necessary, and the interactions and effects of the second embodiment described above can be obtained through a simple structure.

Figure 4:
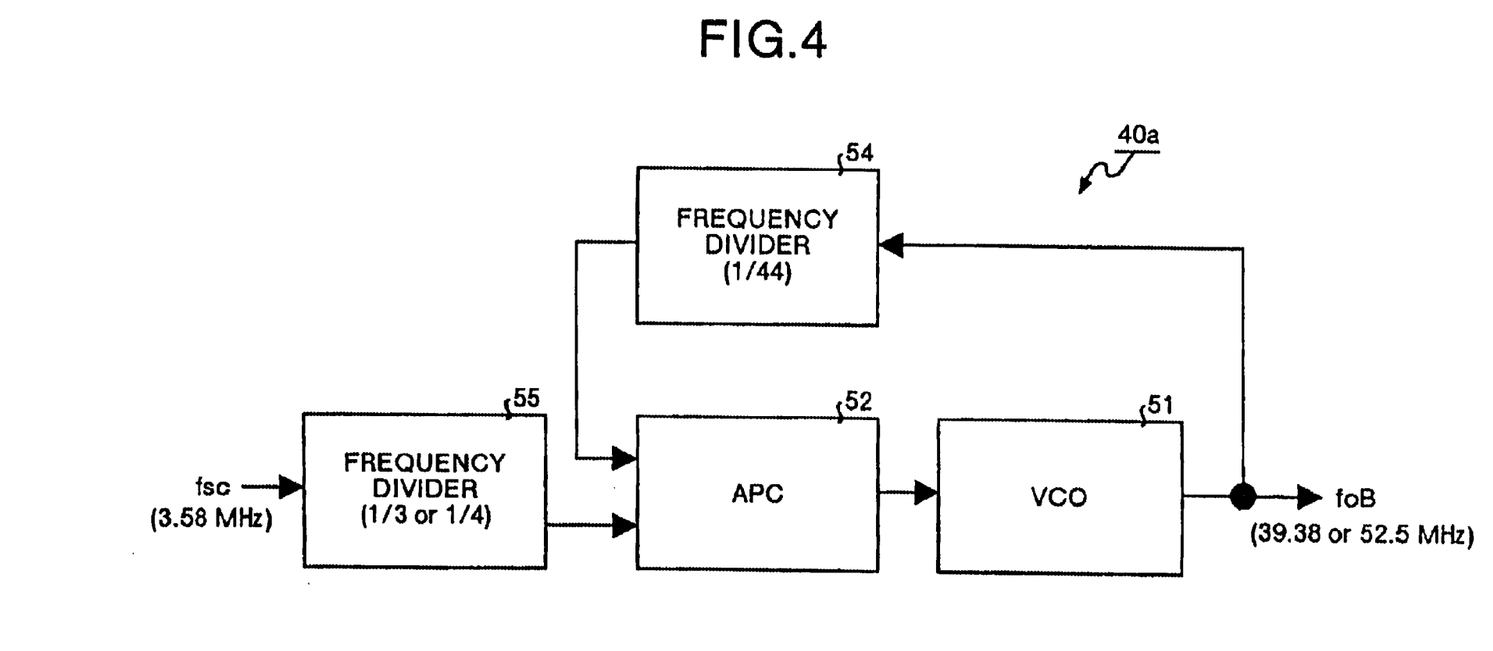
FIG. 4 is a block diagram which shows the structure of the oscillator of a receiver of a fourth embodiment of the present invention.

A fourth embodiment of the present invention will be explained. The third embodiment can be applied only to the case in which the SAW filter 13 passing the video intermediate frequency band having the video intermediate carrier frequency of of 45.75 MHz employed in North American area is employed. However, in this fourth embodiment, even when the SAW filter 13 passing the video intermediate frequency band having a video intermediate carrier frequency of of 58.75 MHz mainly used in Japan is employed, the second embodiment can be realized through a simple structure.

FIG. 4 is a block diagram showing the structure of the oscillator 40a applied to a receiver of the fourth embodiment of the present invention. This oscillator 40a may be used as the oscillator 40a in the second embodiment. This oscillator 40a is provided with a frequency divider 54 dividing the output of the VCO 51 into 44 as a substitute for the frequency divider 53 shown in the third embodiment, and a frequency divider 55 dividing the color signal subcarrier frequency fsc of 3.5 MHz into 3 or 4 and outputting this divided output to the APC 52. Frequency ⅓ or ¼ dividing by means of this frequency divider 55 is switchingly set. Other components are the same as that of the second ad third embodiments.

First, a case will be explained wherein the SAW filter 13 passing the video intermediate frequency band having the video intermediate carrier frequency of of 45.75 MHz employed in North American area is employed. In this case, the frequency divider 55 is switchingly set for ¼ frequency dividing. The frequency divider 55 divides the inputted color signal subcarrier frequency fsc of 3.58 MHz into 4(¼ times frequency) and outputs it to the APC 52. The APC 52 detects the phase difference between the signal outputted from the frequency divider 55 and the signal obtained by dividing the output of the VCO 51 into 44 by means of the frequency divider 54 and outputs it to the VCO 51. The VCO 51 phase locks the oscillation frequency foB of 39.38 MHz that is 44/4 times (11 times) the color signal subcarrier frequency fsc based on that phase difference and outputs it to the APC 18.

In this case, similarly to the third embodiment, the intermediate frequency fsx when receiving the FM radio broadcast signal becomes as follows according to the equation (1).

$$fsx = foB + fs$$
$$= 39.38 \text{ MHz} + 4.5 \text{ MHz}$$
$$= 43.88 \text{ MHz}$$

Since this intermediate frequency fsx is located in approximately the center of the passing band of the SAW filter 13 employed in North American area and there is no gain attenuation, the FM sound intermediate frequency fs having a low sensitivity loss can be generated and outputted.

When the SAW filter 13 passing the video intermediate frequency band having the video intermediate carrier frequency of of 58.75 MHz employed mainly in Japan is used, the frequency divider 55 is switchingly set for ⅓ frequency dividing. The frequency divider 55 divides the inputted color signal subcarrier frequency fsc of 3.58 MHz into 4 (¼ times frequency) and outputs it to the APC 52. The APC 52 detects the phase difference between the signal outputted from the frequency divider 55 and the signal obtained by dividing the output of the VCO 51 into 44 by means of the frequency divider 54 and outputs it to the VCO 51. The VCO 51 phase locks the oscillation frequency foB of 52.5 MHz that is 44/3 times the color signal subcarrier frequency fsc based on that phase difference and outputs it to the APC 18.

In this case, the intermediate frequency fsx of the time of receiving the FM radio broadcast signal becomes as follows according to the equation (1).

$$fsx = foB + fs$$
$$= 52.5 \text{ MHz} + 4.5 \text{ MHz}$$
$$= 57.0 \text{ MHz}$$

Since this intermediate frequency fsx is located in approximately the center of the passing band of the SAW filter 13 employed mainly in Japan and there is no gain attenuation, the FM sound intermediate frequency fs having a low sensitivity loss can be generated and outputted.

Thus, the oscillation frequency foB can be produced utilizing the color signal subcarrier frequency fsc of 3.58 MHz incorporated in a receiver for either of receivers employed in North American area and Japan by switching setting of the frequency divider 55. Accordingly, there is no need to provide a special oscillation source, and the interactions and effects of the second embodiment described above can be obtained through a simple structure.

Figure 5:
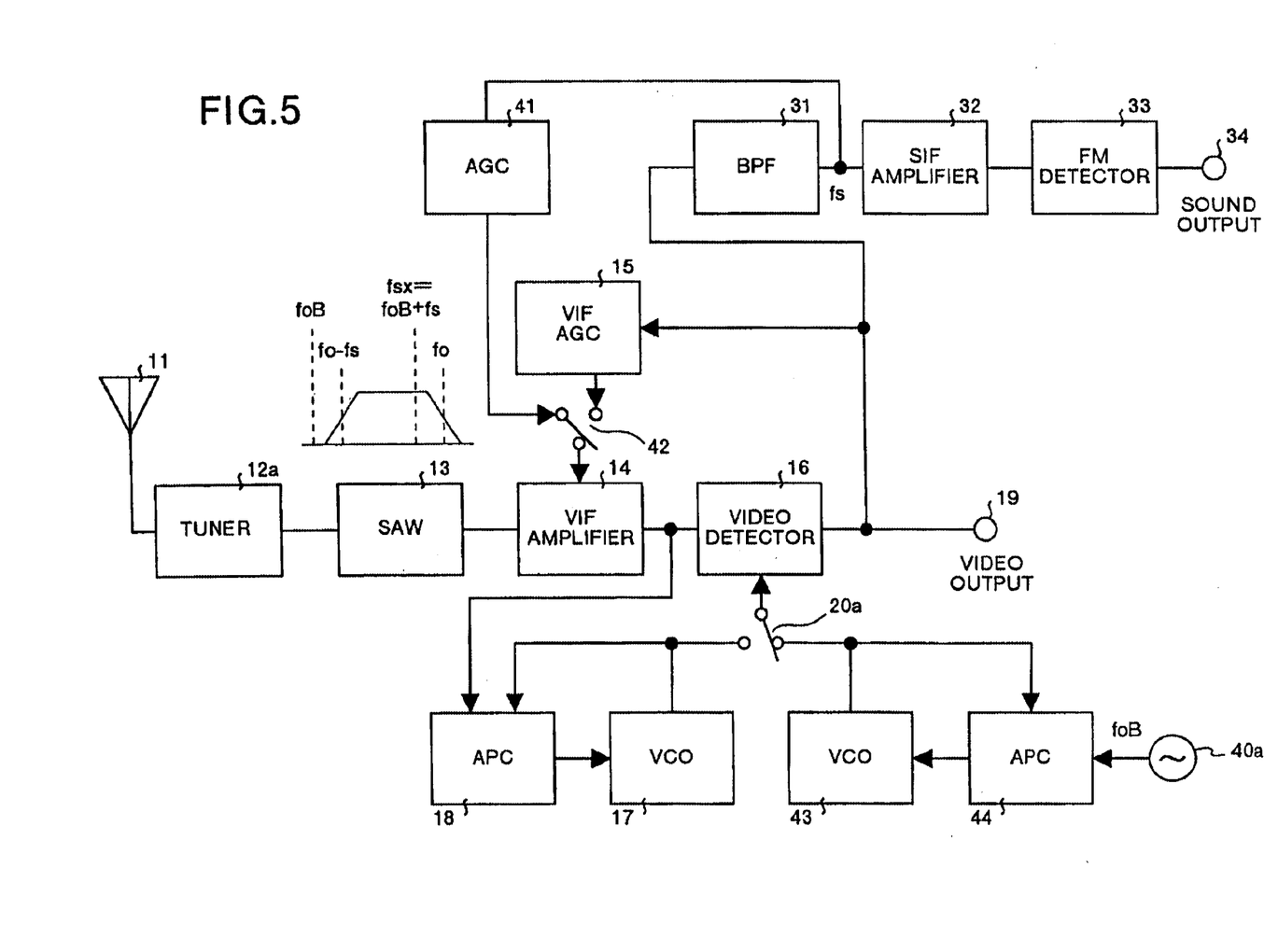
FIG. 5 is a block diagram which shows the structure of a receiver of a fifth embodiment of the present invention.

A fifth embodiment of the present invention will now be explained. FIG. 5 is a block diagram which shows the structure of a receiver of the fifth embodiment of the present invention. This receiver comprises a phase synchronization loop circuit which phase locks the oscillation frequency foB that the oscillator 40a outputs in addition to a phase synchronization loop circuit which outputs the oscillation frequency of obtained by phase locking the video intermediate carrier frequency of that the VIF amplifier 14 outputs to the video detector 16. Further, a switch 20a selectively switches the respective phase synchronization loop circuit outputs and outputting it to the video detector 16. This switch 20a is provided in place of the switch 20. Other components are the same as those explained in connection to the second embodiment.

The switch 20a is connected to a terminal that receives the output of the VCO 17 while receiving the television broadcast signal and is connected to a terminal that receives the output of a VCO 43 when receiving the FM radio broadcast signal. When receiving the television broadcast signal, the APC 18 detects the phase difference between the video intermediate carrier frequency of that the VIF amplifier 14 outputs and the output of the VCO 17 and outputs this phase difference to the VCO 17. The VCO 17 outputs the intermediate carrier frequency of phase locked by this phase lock loop to the video detector 16 via the switch 20a.

When receiving the FM radio broadcast signal, the APC 44 detects the phase difference between the oscillation frequency foB outputted from the oscillator 40a and the output of the VCO 43 and outputs this phase difference to the VCO 43. The VCO 43 outputs the oscillation frequency foB phase locked by this phase lock loop to the video detector 16 via the switch 20a.

The oscillator 40a may be constructed so as to perform outputting by employing the color signal subcarrier frequency fsc as explained in the third and fourth embodiments. Further, as a substitute for the oscillator 40a, the oscillator 40 outputting the oscillation frequency of may be employed. In the case in which this oscillator 40 is employed, similar interactions and effects to the first embodiment are produced.

Thus, since the phase synchronization circuit of the exclusive use of the oscillation frequency foB is provided, frequency drift due to unevenness in the oscillation frequency of the VCO 17 can be surely restrained, and a sound signal having a high quality can be outputted when receiving the FM radio broadcast signal.

As described above, according to the receiver of one aspect of the present invention, when receiving the television broadcast signal, the video intermediate carrier signal that the intermediate frequency amplifier outputs is selected by the first switch, and the second switch is switched and connected to the first automatic gain controller. The tuner converts the television broadcast signal into an intermediate frequency, and the band limit filter passes this intermediate frequency so that the intermediate frequency is amplified by the intermediate frequency amplifier. On this occasion, the intermediate frequency amplifier is gain controlled so that the amplitude of the video signal that the video detector outputs is made constant by the first automatic gain controller. When receiving the FM radio broadcast, the self-running oscillation signal is selected by the first switch, and the second switch is switched and connected to the second automatic gain controller. The tuner converts the FM radio broadcast signal into an intermediate frequency that is the same as the sound intermediate frequency subcarrier signal when receiving the television broadcast signal and outputs it when receiving the FM radio broadcast signal. The band limit filter passes this intermediate frequency, and the intermediate frequency is amplified by the intermediate frequency amplifier. On this occasion, the intermediate frequency amplifier is gain controlled so that the amplitude of the sound subcarrier signal that the sound band limit filter outputs is made constant by the second automatic gain controller. With this, the band limit filter of the exclusive use of sound, the intermediate frequency amplification circuit of the exclusive use of sound, and the intermediate frequency detection circuit of the exclusive use of sound become unnecessary, and a sound signal having a high quality can be demodulated and outputted even when receiving the FM radio broadcast signal. Thus, an effect is produced wherein the a lightweight miniaturization of a receiver can be facilitated.

According to the receiver of another aspect of the present invention, when receiving the television broadcast signal, the video intermediate carrier signal that the intermediate frequency amplifier outputs is selected by the first switch, and the second switch is switched and connected to the first automatic gain controller. The tuner converts the television broadcast signal into an intermediate frequency, and the band limit filter passes this intermediate frequency so that the intermediate frequency is amplified by the intermediate frequency amplifier. On this occasion, the intermediate frequency amplifier is gain controlled so that the amplitude of the video signal that the video detector outputs is made constant by the first automatic gain controller. After that, the video detector outputs the video signal containing the sound subcarrier signal from the intermediate frequency signal of the video intermediate frequency band amplified by the intermediate frequency amplifier. When receiving the FM radio broadcast, the self-running oscillation signal is selected by the first switch, and the second switch is switched and connected to the second automatic gain controller. The tuner converts the FM radio broadcast signal into an intermediate frequency that is the same as the sound intermediate frequency subcarrier signal when receiving the television broadcast signal and outputs it when receiving the FM radio broadcast signal. The band limit filter passes this intermediate frequency, and the intermediate frequency is amplified by the intermediate frequency amplifier. On this occasion, the intermediate frequency amplifier is gain controlled so that the amplitude of the sound subcarrier signal that the sound band limit filter outputs is made constant by the second automatic gain controller. After this, the video detector detects and outputs the sound subcarrier signal from the intermediate frequency signal of the video intermediate frequency band amplified by the intermediate frequency amplifier. On this occasion, the video detector detects and outputs the sound subcarrier signal based on the self-running oscillation signal that the second phase synchronizer outputs which is provided independently of the first phase synchronizer employed when receiving the television broadcast signal. With this, the band limit filter of the exclusive use of sound, the intermediate frequency amplification circuit of the exclusive use of sound, and the intermediate frequency detection circuit of the exclusive use of sound become unnecessary. Further, detecting and outputting a frequency is performed by the first phase synchronizer and the second phase synchronizer each provided independently so that quality deterioration of the sound signal due to unevenness in phase synchronization when receiving the FM radio broadcast signal can be restrained. Thus, effects are produced wherein the a lightweight and small size receiver can be obtained, and a sound signal having a high quality can be outputted.

Further, the tuner converts the FM radio broadcast signal into a sound intermediate frequency carrier signal that is the passing band of the band limit filter and is an intermediate frequency signal having high gain and outputting it when receiving the FM radio broadcast signal, and the oscillator oscillates a self-running oscillation signal obtained by shifting the frequency of the sound intermediate frequency carrier signal by the amount of the sound subcarrier frequency so that the intermediate frequency of the FM radio broadcast signal passes through the frequency band that is the passing band of the band limit filter and in which the attenuation of the gain is small. Thus, an effect is produced wherein a sound signal having a high sensitivity of the FM radio broadcast signal can be outputted.

Further, the producing unit produces a color signal subcarrier frequency signal employed in the NTSC system, and the oscillator phase locks and outputs an oscillation signal having a frequency of 11 times the color signal subcarrier frequency signal so that the color signal subcarrier frequency signal that a receiver of an NTSC system typically incorporates is effectively utilized. Thus, an effect is produced wherein the a lightweight miniaturization of a receiver can be further facilitated.

Further, the producing unit produces a color signal subcarrier frequency signal employed in the NTSC system, and the oscillator selectively switches and outputs the oscillation frequency of 44/3 times the color signal subcarrier frequency signal or the oscillation frequency of 44/4 times the color signal subcarrier frequency signal so that the color signal subcarrier frequency signal that a receiver of an NTSC system typically incorporates is effectively utilized. Thus, effects are produced wherein the a lightweight miniaturization of a receiver can be further facilitated, and receivers used in European and American regions and mainly in Japan can be flexibly dealt with.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A receiver selectively receiving, demodulating, and outputting a television broadcast signal and an FM radio broadcast signal, the receiver comprising:

a tuner which converts an FM radio broadcast signal to an intermediate frequency signal that has the same carrier frequency as a sound intermediate frequency subcarrier signal when receiving a television broadcast signal and outputs the intermediate frequency signal when receiving the FM radio broadcast signal;

a band limit filter which passes only an intermediate frequency signal of a video intermediate frequency band of the television broadcast signal among intermediate frequency signals output by said tuner;

an intermediate frequency amplifier which amplifies the intermediate frequency signal of the video intermediate frequency band output by said band limit filter;

an oscillator which outputs a self-running oscillation signal having the same frequency as a video intermediate carrier signal of the video intermediate frequency band;

a first switch selecting the video intermediate carrier signal output by said intermediate frequency amplifier when receiving the television broadcast signal and selecting the self-running oscillation signal when receiving the FM radio broadcast signal;

a phase synchronizer which generates a signal that has a phase locked to the phase of one of the video intermediate carrier signal and the self-running oscillation signal selected by said first switch;

a video detector which outputs one of a video signal containing a sound subcarrier signal and a sound subcarrier signal from the intermediate frequency signal of the video intermediate frequency band, amplified by said intermediate frequency amplifier, based on the signal output by said phase synchronizer;

a sound band limit filter passing the sound subcarrier signal output by said video detector;

a sound detector which detects and outputs one of a sound signal of the television broadcast signal and a sound signal of the FM radio broadcast signal based on the sound subcarrier signal output by said sound band limit filter;

a first automatic gain controller which changes amplification of the intermediate frequency amplifier when receiving the television broadcast signal and controls the video signal output by said video detector to have a constant amplitude;

a second automatic gain controller which changes the amplification of the intermediate frequency amplifier when receiving the FM radio broadcast signal and controls the sound subcarrier signal passed by said sound band limit filter to have a constant amplitude; and a second switch which selects between the control by the first automatic gain controller and control by the second automatic gain controller and outputs the control selected.

2. The -receiver according to claim 1, wherein said tuner converts the FM radio broadcast signal into the sound intermediate frequency carrier signal within a passing band of said band limit filter output when receiving the FM radio broadcast signal, and said oscillator outputs the self-running oscillation signal by shifting the frequency of the sound intermediate frequency carrier signal by the sound subcarrier frequency.

3. The receiver according to claim 1 further having a producing unit which produces a color signal subcarrier frequency signal employed in the NTSC system, wherein said oscillator includes a phase synchronization loop circuit that phase locks and outputs an oscillation signal having a frequency eleven times the frequency of the color signal subcarrier frequency signal.

4. The receiver according to claim 1 further having a producing unit which produces a color signal subcarrier frequency signal employed in the NTSC system, and said oscillator includes
a first frequency dividing unit which divides the color signal subcarrier frequency signal by three;
a second frequency dividing unit which divides the color signal subcarrier frequency signal by four;
a selection switch which selects one of the output of said first frequency dividing unit and the output of said second frequency dividing unit; and
a phase synchronization loop circuit which phase locks and outputs an oscillation signal having a frequency forty-four times of the frequency of the output signal selected by the selection switch.

5. A receiver selectively receiving, demodulating, and outputting a television broadcast signal and an FM radio broadcast signal, the receiver comprising:

a tuner which converts an FM radio broadcast signal to an intermediate frequency signal that has the same carrier frequency as a sound intermediate frequency subcarrier signal when receiving a television broadcast signal and outputs the intermediate frequency signal when receiving the FM radio broadcast signal;
a band limit filter which passes only an intermediate frequency signal of a video intermediate frequency band of the television broadcast signal among intermediate frequency signals output by said tuner;
an intermediate frequency amplifier which amplifies the intermediate frequency signal of the video intermediate frequency band output by said band limit filter;
an oscillator which outputs a self-running oscillation signal having the same frequency as a video intermediate carrier signal of the video intermediate frequency band;
a first phase synchronizer which phase locks to the video intermediate carrier signal;
a second phase synchronizer which phase locks to the self-running oscillation signal;
a first switch selecting and outputting (i) output of said first phase synchronizer when receiving the television broadcast signal and (ii) the self-running oscillation signal when receiving the FM radio broadcast signal;
a video detector which outputs one of a video signal containing a sound subcarrier signal and a sound subcarrier signal from the intermediate frequency signal of the video intermediate frequency band, amplified by said intermediate frequency amplifier, employing the output of said first switch;
a sound band limit filter passing the sound subcarrier signal output by said video detector;
a sound detector which detects and outputs one of a sound signal of the television broadcast signal and a sound signal of the FM radio broadcast signal based on the sound subcarrier signal output by said sound band limit filter;
a first automatic gain controller which changes amplification of the intermediate frequency amplifier when receiving the television broadcast signal and controls the video signal output by said video detector to have constant amplitude;
a second automatic gain controller which changes the amplification of the intermediate frequency amplifier when receiving the FM radio broadcast signal and controls the sound subcarrier signal passed by said sound band limit filter to have a constant amplitude; and
a second switch which selects control by the first automatic gain controller and control by the second automatic gain controller and outputs the control selected.

6. The -receiver according to claim 5, wherein said tuner converts the FM radio broadcast signal into the sound intermediate frequency carrier signal within a passing band of said band limit filter output when receiving the FM radio broadcast signal, and said oscillator outputs the self-running oscillation signal by shifting the frequency of the sound intermediate frequency carrier signal by the sound subcarrier frequency.

7. The receiver according to claim 5 further having a producing unit which produces a color signal subcarrier frequency signal employed in the NTSC system, wherein said oscillator includes a phase synchronization loop circuit that phase locks and outputs an oscillation signal having a frequency eleven times the frequency of the color signal subcarrier frequency signal.

8. The receiver according to claim 5 further having a producing unit which produces a color signal subcarrier frequency signal employed in the NTSC system, and said oscillator includes
a first frequency dividing unit which divides the color signal subcarrier frequency signal by three;
a second frequency dividing unit which divides the color signal subcarrier frequency signal by four;
a selection switch which selects one of the output of said first frequency dividing unit and the output of said second frequency dividing unit; and
a phase synchronization loop circuit which phase locks and outputs an oscillation signal having a frequency forty-four times of the frequency of the output signal selected by the selection switch.

* * * * *